United States Patent [19]

Dufrancatel

[11] 4,332,115
[45] Jun. 1, 1982

[54] FOLDING CARAVAN

[75] Inventor: Michel Dufrancatel, Bois Guillaume, France

[73] Assignee: Societe Anonyme: Esterel Caravanes, Le Houlme, France

[21] Appl. No.: 97,990

[22] Filed: Nov. 28, 1979

[30] Foreign Application Priority Data

Nov. 28, 1978 [FR] France ............................... 78 33584
May 15, 1979 [FR] France ............................... 79 12273

[51] Int. Cl.³ ........................................... E04B 1/346
[52] U.S. Cl. ......................................... 52/66; 52/69; 296/173
[58] Field of Search ............... 52/66, 69, 64; 296/173, 296/165

[56] References Cited

U.S. PATENT DOCUMENTS

| | | | |
|---|---|---|---|
| 2,656,216 | 10/1953 | Bobroff | 52/66 |
| 3,024,059 | 3/1962 | Hagenson | 296/173 |
| 3,194,251 | 7/1965 | Petersen | 52/66 |
| 3,286,414 | 11/1966 | Harrison | 52/66 |
| 3,317,239 | 5/1967 | Tantlinger | 52/66 |
| 3,709,551 | 1/1973 | McCarthy | 52/66 |
| 3,826,056 | 7/1974 | Smith | 52/829 |
| 3,941,414 | 3/1976 | Platt | 52/66 |

Primary Examiner—James A. Leppink
Assistant Examiner—Henry E. Raduazo
Attorney, Agent, or Firm—Armstrong, Nikaido, Marmelstein & Kubovcik

[57] ABSTRACT

A folding, rigid caravan with assisted erection. A base is carried by a chassis defined by a floor and four lower panels, each of which has an upper edge. Two upper end panels and two upper sidewall panels are provided pivotal about the horizontal axes and disposed respectively either substantially horizontally within the upper opening of the base or substantially vertically as extensions of the corresponding lower panel when the caravan is folded or erected. Each upper panel has a thickness, side edges and two faces defining the thickness. A roof rests horizontally either on the base or on the upper panels, respectively, when the caravan is folded or fully erected and is movably associated with the upper panels by rollers engaging in guideways. At least one unidirectional extensible erecting element is provided connected to the base and to an upper panel to urge the upper panel to pivot permanently in a caravan unfolding direction. Each erecting element is disposed permanently at least partly within the thickness of the panels defining the caravan concealed from the outside and inside. Each erecting element in the erecting position is within a space defined by an upper horizontal edge of a lower panel, a side edge of the upper panel perpendicular to the lower panel, and the two faces of the upper panel parallel to the lower panel when the caravan is erected.

14 Claims, 12 Drawing Figures

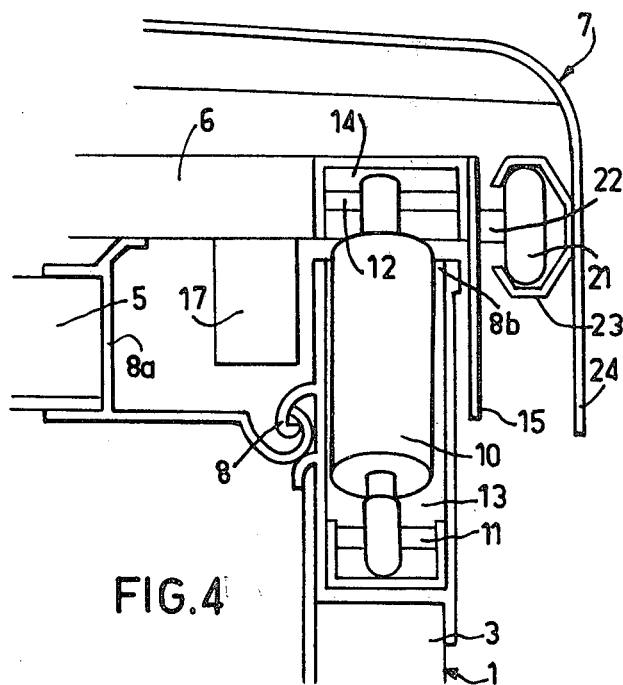
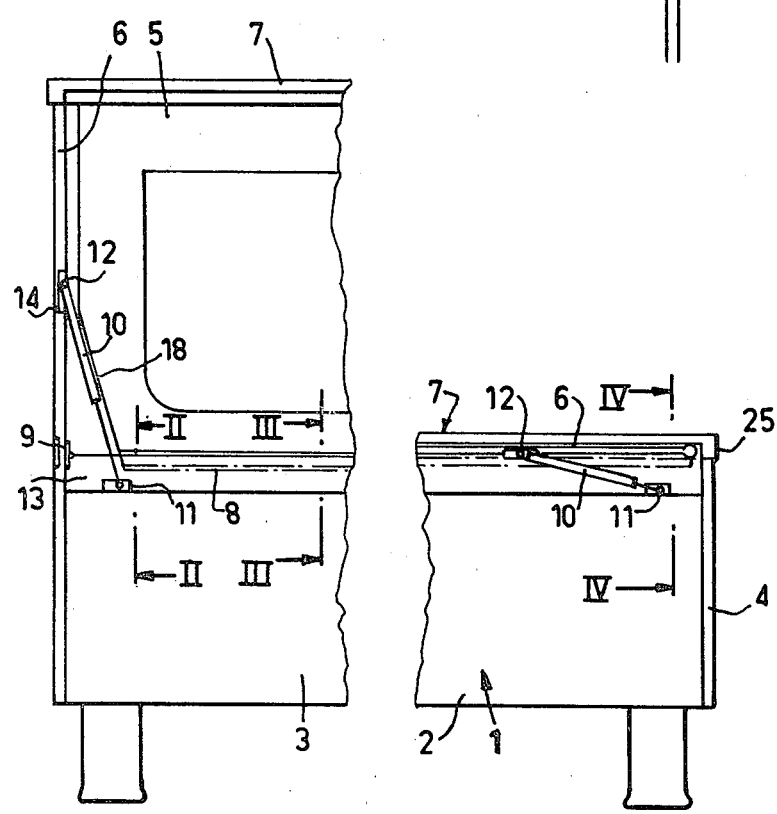

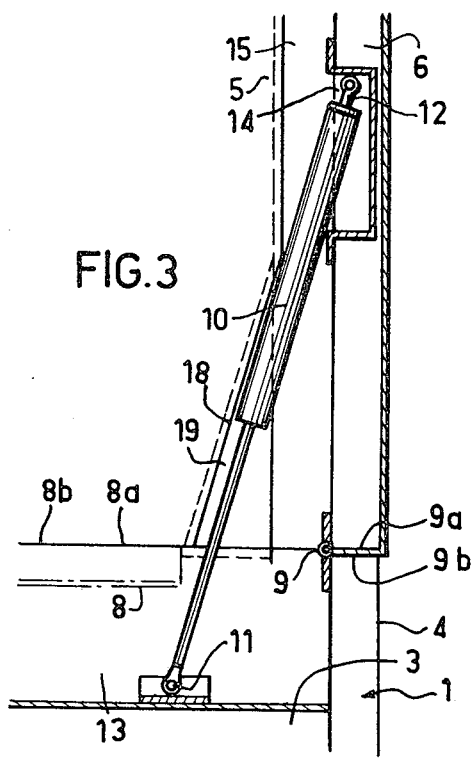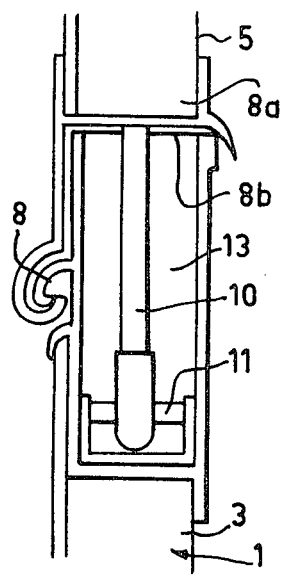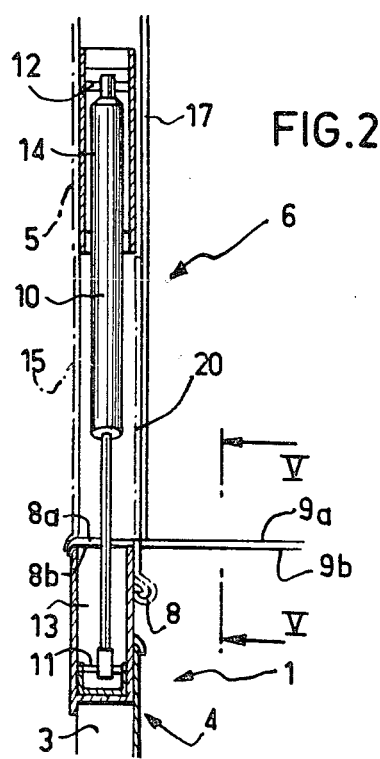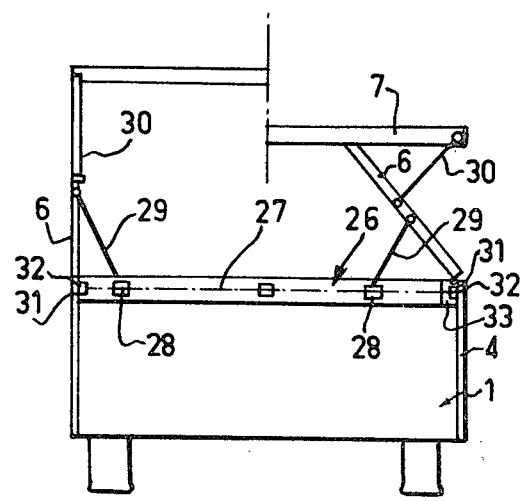

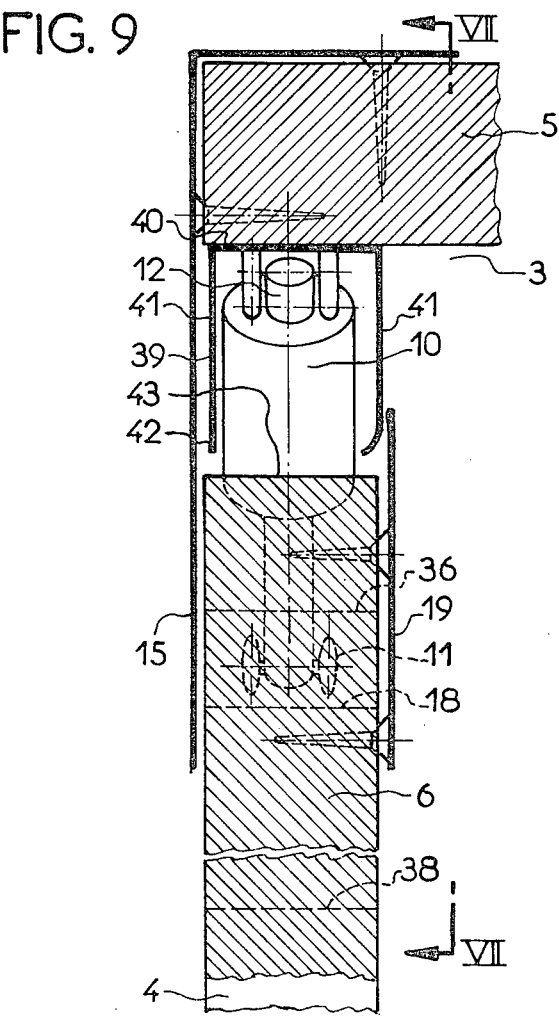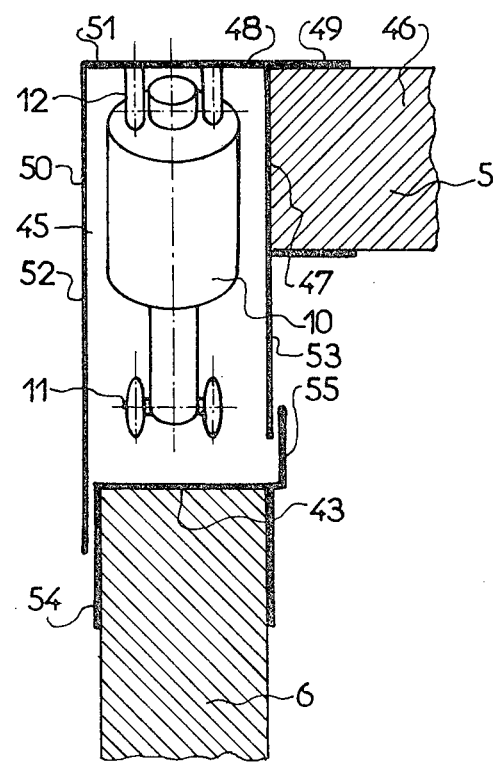

FOLDING CARAVAN

BACKGROUND OF THE INVENTION

The invention relates to a folding rigid caravan with assisted erection and, relates more particularly, to methods for mounting its resilient erecting elements.

Folding rigid caravans with assisted erection are known. These comprise a base carried by a chassis defined by a floor and four substantially vertical lower panels, namely end panels (front and rear) and side panels (right and left); four upper panels, namely end panels (front and rear) and side panels (right and left), pivotal about horizontal axes at the upper free edge of the lower panels and disposed respectively either substantially horizontally in the upper opening of the base or substantially vertically as extensions of the corresponding lower panels when the caravan is folded or completely erected; and a roof pivotally connected to the upper end panels by means of rollers having axes corresponding to the upper horizontal edges of the upper end panels, cooperating with slideways in the roof which rests horizontally either on the base or on the upper panels when the caravan is folded or completely erected. At least one and generally more unidirectional resilient erecting elements such as jacks, for example pneumatic jacks, are each articulated to the base and an upper panel particularly, an end panel, with a view to urging this panel to pivot permanently in the direction of erection of the caravan.

In a first embodiment (French Pat. No. 2,284,480) the erecting elements are disposed permanently and entirely outside the caravan and, at least when it is erected, across the horizontal plane defined by the pivotal axes of the upper side panels, hereinafter called plane P. This arrangement permits the location of the erecting elements with the proper inclination for conferring on them maximum efficiency, but on the other hand they are visible on the exterior of the caravan and are subject to shocks. As a variation (French Pat. No. 2,296,545), the erecting elements are partially located in a casing arranged as an extension of the caravan base with consequent drawbacks.

In a second embodiment, the erecting elements are disposed permanently and entirely inside the caravan that is to say the space defined by the base, the upper panels and the roof. Three variations of this construction have been proposed.

In the first construction (French Pat. No. 2,355,692), the erecting elements are located permanently and entirely above plane P and are articulated to the base by cranked members of L-form in order not to hinder pivoting of the side panels once the end panels are raised. This construction is thus complex, costly, non-aesthetic (since the erecting elements are located opposite the upper panels) and dangerous since if the upper end panels are not in their correct position, the upper side panels can interfere with the erecting elements.

In the second construction, the erecting elements are located across plane P. Thus in order to allow pivoting of these panels, at least one of the pivotal connections of each erection element is removable which has the drawback of being non-aesthetic, poorly designed and not very reliable.

In the third construction (French Pat. No. 2,263,907) the erecting elements are located permanently and entirely above plane P. To allow for pivoting, the upper side panels are connected to the base by hinges with offset axes, which has the drawback of being non-aesthetic, costly and unsatisfactory.

In the three constructions, a space for the passage of the erecting element is provided between each vertical edge of the upper side panels and the internal face of the adjacent upper end panel. This space is concealed, when the caravan is erected, by a batten securely fixed to the upper end panel on its internal face and along its edge. It is thus equally necessary to provide a housing space for these battens when the caravan is erected. For example, the upper edges of the lower end panels are disposed above those of the lower side panels and the base thus has a non-aesthetic step in the region of its opening, creating problems of weather-tightness and necessitating that the roof be provided with a vertical depending edge forming a cover masking this stepping. This depending edge is equally essential to rigidify the roof due to insufficient seating on the base. This weighting of the roof requires the provision of more powerful erecting elements and creates numerous other problems in manufacture and usage of the caravan.

Thus, known constructions of folding rigid caravans with assisted erection are not very satisfactory insofar as the erecting elements are concerned.

SUMMARY OF THE INVENTION

The invention seeks to obviate these drawbacks and proposes a folding caravan with assisted erection by means of resilient erecting elements in which the resilient erecting elements are disposed not outside or, properly speaking, inside the caravan but in housings or grooves provided for this purpose within the thickness of the panels of the caravan and concealed both from the exterior and the interior, that is, each erecting element in the erected position is within a space defined by an upper horizontal edge of a lower panel, a side edge of the upper panel perpendicular to the lower panel, and the two faces of the upper panel parallel to the lower panel.

BRIEF DESCRIPTION OF THE INVENTION

The other features of the invention will be understood by virtue of the ensuing description referring to the accompanying drawings in which:

FIGS. 1A and 1B are two partial half-views of the caravan folded and erected, respectively;

FIG. 2 is a cross-sectional view to an enlarged scale along line II—II in FIG. 1B;

FIG. 3 is a cross-sectional view to an enlarged scale along line III—III in FIG. 1B;

FIG. 4 is a cross-sectional view to an enlarged scale along line IV—IV in FIG. 1A;

FIG. 5 is a cross-sectional view to an enlarged scale along line V—V in FIG. 2;

FIG. 6 is a schematic view showing a variation of the control means for the erection of the caravan;

FIG. 9 is a schematic cross-sectional view along a horizontal plane including line IX—IX of FIG. 7, the caravan being erected;

FIG. 10 is a schematic cross-sectional view along a horizontal plane showing a variation of the caravan shown in FIG. 9.

DETAILED DESCRIPTION OF THE INVENTION

Figure 7:
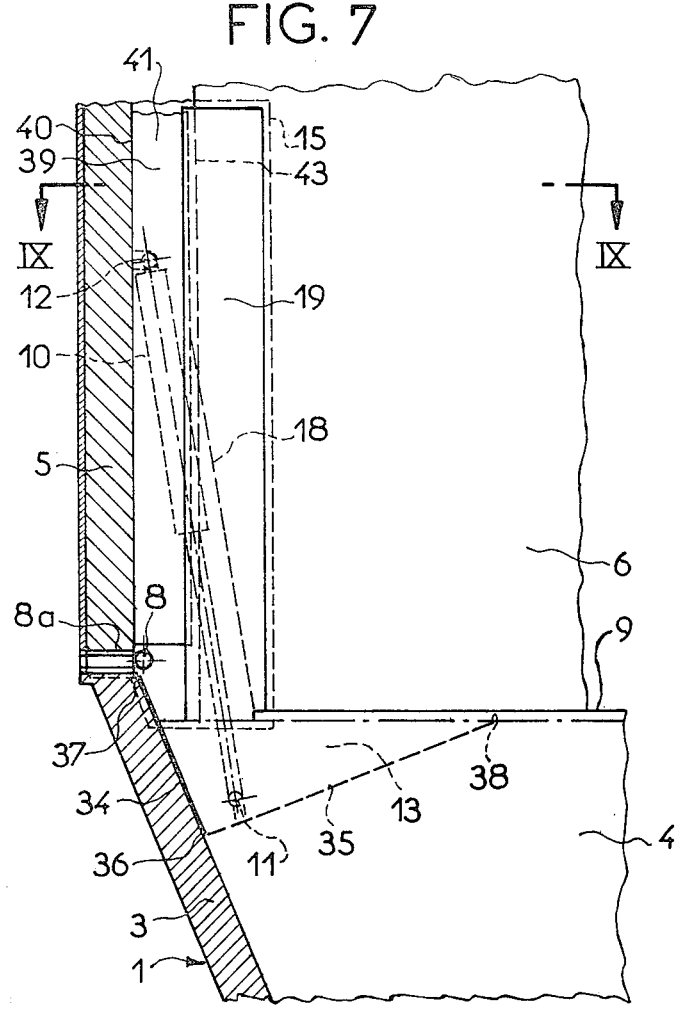
FIG. 7 is a partial diagrammatic cross-sectional view along a vertical plane on line VII—VII in FIG. 9 along the median line of a caravan according to the invention in an erected condition.

The folding rigid caravan with assisted erection according to the invention comprises a base 1, carried by a chassis with towing arrangement and defined by a floor 2, which is normally horizontal, four lower substantially vertical panels—respectively, and panels 3 (front and rear) and side panels 4 (left and right), and four upper panels—respectively, end panels 5 (front and rear) and side panels 6 (left and right) and a movable roof 7 is associated with the upper panels.

The base 1, the floor 2, and the panels 3, 4, 5, 6, and the roof 7 are of rigid construction and made out of suitable material such as wood, metal, plastics material etc.

Each upper end panel 5 is hinged along its horizontal lower free edge 8a respectively to the upper horizontal free edge 8b of the corresponding lower end panel 3 and is thus pivotally movable about an axis.

Each upper side panel 6 is hinged along its lower free edge 6 respectively to the upper horizontal free edge 9b of the lower side panel 4 and is thus pivotally movable about an axis 9.

The upper panels 5, 6 are located either substantially vertically and as extensions of the corresponding lower panels 3, 4, or substantially horizontally in the upper opening of the base 1 when the caravan is respectively either fully erected or folded. Each upper panel 5,6 has a thickness, side edges and two faces defining the thickness.

The edges 8b, 9b of the lower panels 3 and 4 are coplanar, that is to say the base 1 is level in the region of its opening. In combination and when the caravan is folded, the upper side panels 6 are coplanar and in abutment on the upper end panels 5 which are also coplanar. To this end, the axes 9 are situated at least substantially in the horizontal plane defined by the horizontal free upper edges 8b, 9b and the axes 8 located in a horizontal plane situated at a slightly lower level in such a manner that the spacing between these two planes corresponds to the thickness allowing the location of the upper end panels 5 below the upper side panels 6. In this way, in order to cause the articulation between an upper end panel 5 and a lower end panel 3, one can use an offset axis or the like.

The caravan also comprises at least one and, generally several unidirectional resilient erecting elements 10, namely jacks, for example pneumatic jacks, hinged to the base 1 particularly to a lower end panel 3 and to an upper panel, particularly a side panel 6 respectively by spindles 11, 12 which are horizontal and parallel with a view to urging the upper side panel 6 constantly into an erected condition. In particular, two elements 10 for the panel 6 are provided but the invention also applies to a different number of elements 10 and also to different arrangements of the elements 10 and the panels 4 and 5.

The elements 10 are not located on the exterior nor strictly speaking on the interior of the caravan, but in an intermediate zone defined by the panels 3, 4, 5, 6 in order to eliminate the drawbacks of known arrangements.

To this end, in a first possible arrangement, a housing or groove 13 is located in the upper horizontal edge of each panel particularly the end panel 3 which is hinged to an element 10 with a sufficient depth to allow the element 10 to be placed entirely therein when the caravan is folded. This housing or groove 13 is provided either in the form of a hollowed-out area in the lower panel 3 or preferably by means of a profile of appropriate shape constituting the upper horizontal free edge 8b of the said panel. Several variations of this arrangement are described below. The housing or groove 13 permits the stowing of the element 10 when not in use and allows access thereto in case of need.

The spindles 11, 12 are secured respectively to the base 1 and to the upper panels notably 6 by appropriate means in the form of a joint. In order that the element 10 have maximum effect, the spindle 11 is located preferably at the base of the housing or groove 13, that is to say offset towards the base in relation to the plane of the axes 9 and disposed towards the interior of the caravan in the direction of a median vertical plane of symmetry of the latter. Thus, the spindle 11 is transversely offset from the neighbouring axis 9. The spindle 12 is situated on a panel 6 sufficiently offset from the corresponding axis 9. In order to avoid excessive projection of the element 10 from the internal face of the upper side panel 6 at the level of the joint associated with the spindle 12, the spindle 12 is preferably located in a housing 14 hollowed for this purpose in the upper side panel 6 from its interior face.

The housing or groove 13 extends along all or only a part of the edge of a lower end panel 3 between the two opposed panels 4.

In order to allow movement of the upper end panels 5, it is provided, in known manner, that the spacing between the two normally vertical edges of a panel 5 is smaller than the spacing between the internal faces of the two panels 6. The existing clearance is thus masked externally in a known manner by means of flaps 15 which are provided on the panels 6. These flaps 15 are arranged in coplanar pairs in the plane of the vertical edges of the panels 6 and extend towards the interior of the caravan and are provided in particular by the attachment of angle irons or the like to the panels 6. The clearance is masked on the inside by means of battens 17 or the like rigidly fixed to the panels 6.

Each lower corner of an upper end panel 5 is bevelled as at 18 which defines a free space for the passage of the elements 10. The apertures left by these bevels 18 are masked externally by plates 19 having triangular corners which are integral or attached to the flaps 15 and, internally, by similar angle plates 20 fixed to the panels 5.

The roof 7 as described above is ssociated with the upper side panels 6 and not with the upper end panels 5, as is known. This is accomplished by means of rollers 21 pivotally mounted on the panels 6 around shafts 22, which are adjacent the upper horizontal edges of the panels cooperating with complementary guide-ways 23 fixed to the depending end edge 24 of the roof 7. This arrangement has the effect that, on the one hand, the increase in bulkiness caused by the rollers 21 and guideways 23 is formed at the front and rear ends of the caravan and not along the sides and, on the other hand, the free space inside the caravan can be increased and used efficiently. The lower horizontal edge of the depending side edge 25 bears on the upper edge 9b of the panels 4 (contrary to known arrangements), where support of the roof 7 on the base 1 allows lightening of the roof 7 and the elements 10. Equally, the panels 6 can, when the caravan is folded, be placed to one side and to the other. To this end, the height of the upper panels 5, 6 is at the most equal to half the width of the base 1 measured between the axes 9. The panels 5 are thus no longer load-bearers and can be used for other specific purposes. For example, the panels 5 are able to be designed in order to be folded down along their width in the same manner as a ventilator to enable air to circulate. Naturally, this particular association of the roof 7 with the panels 6 is in no way limiting and the invention applies equally to the case where the roof 7 is associated with the panels 5.

FIG. 6 shows a variation of a caravan as described above comprising means for actuating the panels 6 usually in the form of screw jacks 26 placed in the housings or grooves 13 provided with two threads 27 of opposed direction, each of which cooperates with a nut 28 of opposed thread. On each nut 28 is hinged a strut 29 which is hinged at its other end to one panel 6 in particular in the housing 14. The struts 29 can thus be located in the housings or grooves 13 when the caravan is folded. Counterbalancing struts 30, hinged to the panels 6 on the one hand and to the roof 7 on the other hand permit keeping the roof 7 in permanent horizontal equilibrium. By means of a bevel gear 31 and a shaft 32, the two screw jacks 26 can be driven by drive means 33 such as a motor located in the base 1 of the caravan.

The housing 13 can be made in various ways as will be described hereafter in the case where the elements 10 are associated with the panels 5 (but which can also be employed in the case of the panels 6).

Figure 8:
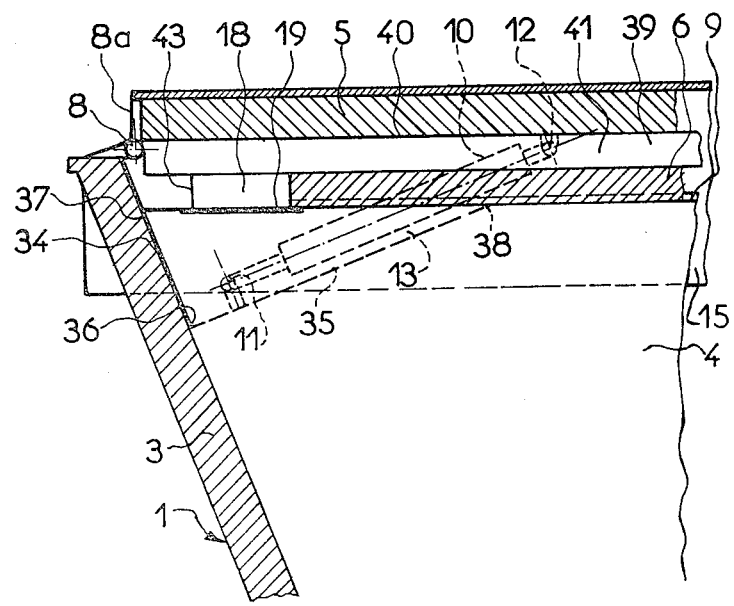
FIG. 8 is a schematic view in partial cross-section along a vertical median plane of a caravan according to the invention in a folded condition.

In a first variation (FIGS. 7 and 8) the housing 13 is in the form of a recess or groove, inside a panel 4 and extending from the adjacent panel 3, limited on its two major plane and parallel faces respectively by the inside and the outside faces of the panel 4. The recess is, in elevation, of V-shape or pseudo V-shape wherein a first arm 34 is coplanar with the internal face and inclined to the panel 3 and whereof a second arm 35 is also inclined and is directed upwards towards the middle part of the caravan which is also inclined. The two arms 34 and 35 define at their junction a lower point 36. The free tips 37, 38 of the branches 34 and 35 define the upper opening of the recess, which is the housing 13. This opening is defined sectorially which does not weaken the panel 4 and allows the attachment and the seating of the panel 6 on the upper horizontal edge of this panel 4. The inclination of the arm 35 is such that it allows the housing of the element 10 when the caravan is folded (FIG. 8). The spindle 11 is carried either by the panel 3 or by the panel 4 particularly in the vicinity of the point 36. In this particular arrangement the base 1 presents an upper opening with displacement towards the base at the level of the upper edges of the panels 4, that is to say the upper edges of the panels 4 are located beneath the upper edges of the panels 3 in such a manner that the panels 6 are at least substantially juxtaposed and coplanar under the panels 5 when the caravan is folded.

According to another possible variation, there is provided a profile 39 of U-shape of which the core 40 is attached to the internal face of the panel 5. This profile 39 extends from the edge 8a in the direction of the upper horizontal edge opposite the panel 5 and is located in order to lie over the opening of the housing 13 when the caravan is folded (FIG. 8). The spacing between the two flaps 41 of the profile 39 corresponds substantially to the thickness of the panel 4 and the panel 6 with which the profile 39 extends. The element 10 is located at least partially at its upper part in the profile 39 which supports the spindle 12. The free side edges 42 of the flaps 41 are spaced from the vertical edge 43 opposite the panels 6 in a manner such that the profile 39 does not interfere with this panel 6 when in the vertical position. Naturally, within the scope of the invention, other embodiments of the profile 39 can be employed, in particular in the form of two angle members or the like.

More generally, the profile 39 is replaced by any appropriate member giving a satisfactory spacing between the two spindles 11, 12 in order to improve the action of the element 10 at the instant of opening of the caravan while permitting housing of the element 10 at least as regards its part outside the housing 13.

The free edge of the flap 41 can cover the attached plate 19 to conceal the bevelling 18.

The combination of the housing 13 such as described, the bevelling 18, the plate 19 and the profile 39 constitutes a continuous housing—with the caravan folded or wholly erected—formed within the thickness of the caravan wall and in which is disposed the element 10.

In another embodiment (FIG. 11) the housing 13 is omitted and the element 10 is pivoted directly to the base 1 or in the region of the upper horizontal edge of the longitudinal lower panel 4.

Figure 11:
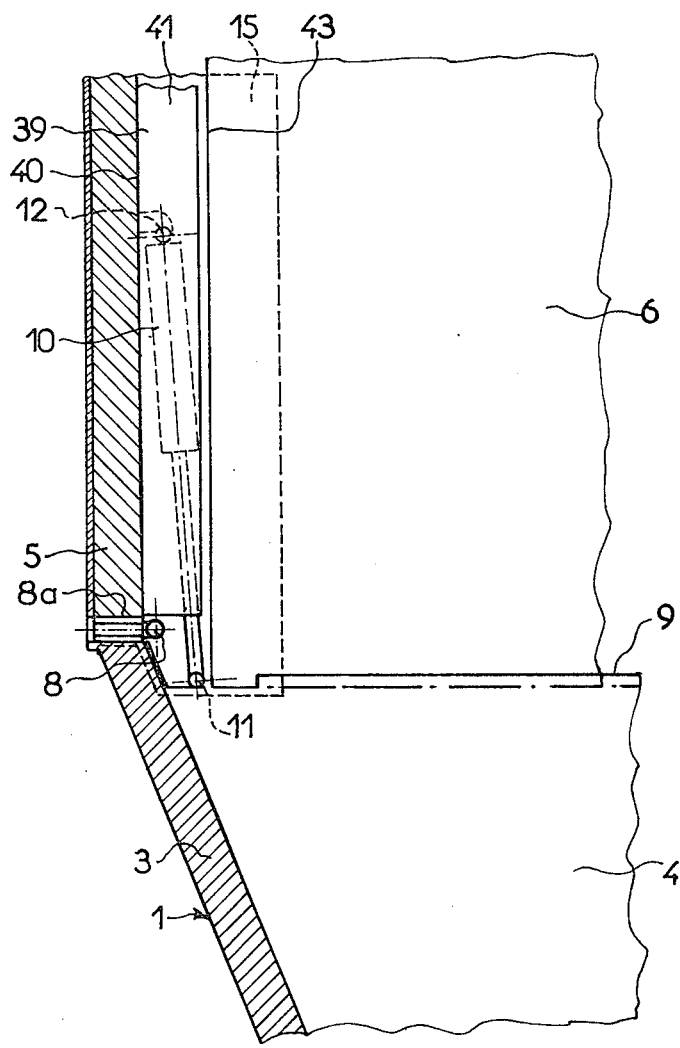
FIG. 11 is a schematic cross-sectional view along a vertical plane showing a variation of FIG. 7.

In yet another variation also illustrated in FIG. 11 but applicable to other embodiments already described, the bevelling 18 and possibly the plate 19 are omited which is possible due to the inclination given to the element 10 and the spacing between the vertical edge 43 of the panel 6 and the internal face of the panel 3.

In the embodiment of FIG. 10, the housing 13 in the base 1 is totally or partially omitted as indicated above and the element 10 is at least partially disposed in a housing 45 associated with an upper end panel 5. In this embodiment, the panel 5 comprises a core 46 enclosed at its vertical edge 47 by a profile 48 forming a corner of the panel 5. The profile 48, which is made of metal or plastics material, comprises a first U-shaped part 49 with which the core 46 cooperates to ensure a rigid connection between the core 46 and the profile 48, and a second U-shaped part 50, whereof the core 51 is an extension of the exterior flap of U-shaped part 49, this second U-shaped part 50 constituting the ousing 45 and the resilient element 10 being connected by its spindle 12 to the core 51. Similarly to previously described embodiments, the external flap 52 of the second U-shaped part 50 is longer than the internal flap 53. The element 10 is, for example, directly connected to the panel 4 at its upper horizontal edge. The panel 6 is provided on its edge 43 with a profile 54 of inverted U-form with a flap 55 having a function corresponding to that filled by the attached plate 19.

In this construction, the flaps 52 and 53 have an identical purpose to that filled by flaps 15 and 41. This particular construction permits either omission of the housing 13 as described, or reducing it, or inclining the element to increase its effect.

What is claimed is:

1. Folding rigid caravan with assisted erection comprising a base carried by a chassis defined by a floor and four lower panels, each having an upper horizontal edge, two upper end panels and two upper side wall panels pivotal about horizontal axes and disposed respectively, either substantially horizontally within the upper opening of the base or substantially vertically as extensions of the corresponding lower panel when the caravan is folded or erected, each upper panel having a thickness, side edges, and two faces defining said thickness, a roof resting horizontally either on the base, or on the upper panels respectively when the caravan is folded or fully erected, movaly associated with the upper panels by rollers engaging in guideways; at least one unidirectional extensible erecting element, each connected to the base and to an upper panel to urge said upper panel to pivot permanently in the caravan unfolding direction, characterized by the fact that each erecting element is disposed permanently at least partly within the thickness of the panels defining the caravan, concealed from the outside and inside, each erecting element in the erected condition being within a space defined by an upper horizontal edge of a lower panel, a side edge of the upper panel perpendicular to the lower panel and the two faces of the upper panel parallel to the lower panel when the caravan is erected.

2. Folding caravan according to claim 1, characterised by the fact that at least one housing or groove (13) is provided within the thickness of lower panel to which is connected the erecting element (10) extending from the upper horizontal edge of said panel and facilitating at least partial housing of the erecting element (10).

3. Folding caravan according to claim 1, characterised by the fact that the upper panel to which the erecting element (10) is connected has a housing (14, 45) at least at the level of the connection of the erecting element (10) and in which the latter (10) is at least partially disposed.

4. Caravan according to any one of claims 1 to 3, characterised by the fact that the clearances existing between the upper end panels and the upper side wall panels are concealed both from the exterior and the interior.

5. Caravan according to claim 1 characterised by the fact that the lower corners of the upper panels with which the erecting elements are not associated are bevelled to permit the passage of the erecting elements.

6. Caravan according to 5, characterised by the face that plates are provided to mask the openings created by the bevelling.

7. Caravan according to claim 1, characterised by the fact that pivot axes of the upper panels with which the erecting elements are not associated are disposed in a horizontal plane at a lower level than the pivot axes of the upper panels with which the erecting elements are associated.

8. Caravan according to claim 1, characterised by the fact that the housing (13) is in the form of a pseudo V-shaped recess in a lower panel, bounded by a first arm (34), a second arm (35) defining a point (36) at the location of or in the vicinity of which the axis (11) is located, the free end parts (37, 38) of the two arms 34, 35) defining the opening of the recess which is sectorial.

9. Caravan according to claim 1 characterised by the fact that the housing (45) is defined by a second U-recess (50) of a shaped section (48) having a first part (49) with which cooperates the core (46) of a panel with which the erecting element (10) is associated.

10. Caravan according to claim 1 characterised by the fact that a shaped section (39) is provided rigidly fixed to the upper panel with which the erecting element is associated and in which is at least partially disposed the erecting element (10) having at least one flap (41) masking the opening existing between the upper panels.

11. Caravan according to 1 characterised by the fact that the upper horizontal edges (8b, 9b) of the base (1) are coplanar.

12. Caravan according to claim 1 characterised by the fact that the roof (7) has a depending longitudinal edge (25) which can rest on the corresponding upper edge of the lower panels of the base (1).

13. Caravan according to claim 1 characterised by the fact that an erecting element (10) is associated with an upper end panel (5).

14. Caravan according to claim 1 characterised by the fact that the erecting elements (10) are associated with an upper side panel.

* * * * *